United States Patent
Kuo et al.

(10) Patent No.: US 8,776,342 B2
(45) Date of Patent: Jul. 15, 2014

(54) MODULE FOR ON-LINE VIBRATION DETECTION AND ADJUSTMENT AND MACHINING CENTER USING THE SAME

(75) Inventors: Tzu-Hsin Kuo, Taipei County (TW); Chun-Hung Huang, Hsinchu (TW)

(73) Assignee: Industrial Technology Research Institute, Hsin-Chu (TW)

(*) Notice: Subject to any disclaimer, the term of this patent is extended or adjusted under 35 U.S.C. 154(b) by 840 days.

(21) Appl. No.: 12/871,419

(22) Filed: Aug. 30, 2010

(65) Prior Publication Data
US 2011/0222980 A1  Sep. 15, 2011

(30) Foreign Application Priority Data

Mar. 12, 2010  (TW) ............................. 99107307 A

(51) Int. Cl.
| | |
|---|---|
| B23Q 17/00 | (2006.01) |
| B23Q 11/00 | (2006.01) |
| B23Q 17/12 | (2006.01) |
| G05B 19/404 | (2006.01) |
| G05B 19/4065 | (2006.01) |

(52) U.S. Cl.
CPC ........ B23Q 11/0039 (2013.01); *G05B 19/4065* (2013.01); *B23C 2250/16* (2013.01); B23Q 17/12 (2013.01); G05B 19/404 (2013.01); *G05B 2219/37434* (2013.01); *G05B 2219/41117* (2013.01); *G05B 2219/41122* (2013.01); *G05B 2219/41128* (2013.01); *G05B 2219/42077* (2013.01); *G05B 2219/49176* (2013.01)
USPC ......... 29/407.07; 408/143; 409/141; 700/174

(58) Field of Classification Search
CPC ............... B23Q 17/12; B23Q 17/0971; B23Q 17/0976; G05B 19/4065; G05B 19/4142
USPC ........ 29/407.07, 821, DIG. 46; 409/141, 235; 73/777, 801, 862.41, 862.59; 408/143; 700/174
See application file for complete search history.

(56) References Cited

U.S. PATENT DOCUMENTS

| 4,683,542 | A * | 7/1987 | Taniguti ........................... 702/56 |
|---|---|---|---|
| 5,178,669 | A | 1/1993 | Watanabe et al. |
| 5,187,669 | A | 2/1993 | Wildes et al. |
| 5,237,779 | A * | 8/1993 | Ota ................................. 451/5 |
| 7,024,934 | B2 * | 4/2006 | Yu .............................. 73/514.37 |
| 7,370,524 | B2 | 5/2008 | Hopkins |
| 7,540,697 | B2 | 6/2009 | Wang et al. |
| 2008/0000301 | A1 * | 1/2008 | Davidson ........................ 73/654 |
| 2010/0104388 | A1 * | 4/2010 | Suzuki et al. .................. 409/131 |

FOREIGN PATENT DOCUMENTS

| JP | 2002116016 A | * | 4/2002 |
|---|---|---|---|
| SU | 591825 A | * | 1/1978 |
| TW | 200630182 | | 9/2006 |
| TW | I289092 B | | 11/2007 |
| TW | I311089 B | | 6/2009 |

* cited by examiner

*Primary Examiner* — Jermie Cozart
(74) *Attorney, Agent, or Firm* — Morris Manning & Martin LLP; Tim Tingkang Xia, Esq.

(57) ABSTRACT

A module for on-line vibration detection and adjustment and machining center using the same are provided in the present invention, wherein the module is disposed at the machining center having an interface of feedrate override and an interface of spindle override and the inverter. The module comprises at least one vibration sensor for detecting the vibrating status of the machining center, thereby generating corresponding at least one sensing signal and a processor for processing the at least one sensing signal so as to generate a spindle adjusting signal for the interface of spindle override and the inverter and a feedrate adjusting signal for the interface of the federate override. The computer numerical controller receives the spindle adjusting signal and the feedrate adjusting signal from the interface of the spindle override and federate override respectively and accordingly controls the feedrate and spindle rate of the machining center.

20 Claims, 5 Drawing Sheets

MODULE FOR ON-LINE VIBRATION DETECTION AND ADJUSTMENT AND MACHINING CENTER USING THE SAME

CROSS-REFERENCE TO RELATED APPLICATION

This non-provisional application claims priority under 35 U.S.C. §119(a) on Patent Application No(s). 099107307 filed in Taiwan, R.O.C. on Mar. 12, 2010, the entire contents of which are hereby incorporated by reference.

TECHNICAL FIELD

The present disclosure relates to a technique for on-line vibration detection and adjustment, and more particularly, to an on-line vibration detection/adjustment module and a machining center using the same that are capable of controlling the feed rate and the spindle rate of the machining center according to the detection of the on-line vibration detection/adjustment module by the use of a spindle override interface and a feedrate override interface.

TECHNICAL BACKGROUND

Most times being unintended and undesirable that can result in imprecise processing and deteriorated surface qualities, machining vibration during the machining of any machining center can be the most troubling problem that the machining center tool industry tries to avoid. Vibration can result from a number of conditions, acting alone or in combination, such as inproper configuration in cutting parameters, dynamic unbalance in cutting tool assembly, chattering correspond to the relative movement between the workpiece and the cutting tool that can result in waves on the machined surface, thickness variation in workpiece that is to be machined, and resonance, etc. Since the effect of machining vibration can severe that, for instance, it can accelerate rates of wear in cutting tools, can cause the surface quality of a workpiece to deteriorate, and even cause deterioration in spindle accuracy, it is important for a machining center to be capable of preventing any machining vibration in an automatic manner during machining without inducing any adverse affect upon its machining efficiency.

In a prior art disclosed in U.S. Pat. No. 5,187,669, a vibration suppression technique is revealed, which teaches the use of an accelerometer to measure a vibration status resulting from a machining process so as to be used as base for controlling a gain in a control circuit and thus suppressing the vibration of the machining process. Please refer to FIG. 1, which is a schematic diagram showing a conventional machining center configuration. In FIG. 1, a computer numerical controller 10 mounted in a machining center 1 is coupled respectively to a feeding module 11, a spindle module 12, a spindle override interface 13 and a feedrate override interface 14, in which the spindle module 12 is further comprised of a spindle 120 and an inverter 121, while the feeding module 11 is further comprised of an X-axial motor 110, a Y-axial motor 111, a Z-axial motor 112 as well as their corresponding drivers 113, 114 and 115 that are connected to the computer numerical controller 10. It is noted that the computer numerical controller 10 is used for generating commands for controlling the spindle module 12 and the feeding module according to a numerical control (NC) code 15 received thereby; and the machining center 1 for enabling the same to perform a two-dimensional displacement whereas the carrier module is used for carrying a workpiece to be processed; and the Z-axial motor 112 is acting as a driving component for enabling the spindle module 12 to move in the Z-axial direction. Generally, the NC code 15 received by the computer numerical controller 10 includes process parameters, such as the material of the workpiece to be processed, the moving path of the carrier module and the spindle speed of the spindle in the spindle module, and so on. However, under the performing of a machining process, machining vibrations may occur due to the varying machining conditions or the status variations in the machine parts of the machining center, which can seriously affect the quality of the workpiece to be process as well as the precision of the machining process. Nevertheless, since the causes of such machining vibrations are hard to predict, it is difficult to control the machining vibrations simply by adjusting the NC code.

In view of that, there are a feedrate adjusting button 17 and a speed adjusting button 16 disposed in the machining center 1 of FIG. 1 while enabling the two adjusting buttons 17, 16 to be coupled respectively to the feedrate override interface 14 and the spindle override interface 13, by that an user is capable of adjusting the feedrate and the spindle speed in a real-time and on-line manner. However, although there is a manual adjustment mechanism established on the machining center 1 using the two adjusting buttons 16, 17, the manual adjustment tends to be performed differently with different users as there is no standard for the adjustment and thus different users are going to perform the manual adjustment according to their personal experiment. Therefore, it is in need of an external adjustment control architecture for the machining center without the need to change the structure of the machining center that is able to generate a control command automatically according to a detection result for controlling the adjustment of the machining center and thus effectively preventing any machining vibrations from happening in the operating machining center.

TECHNICAL SUMMARY

The present disclosure provides an on-line vibration detection/adjustment module and a tool machining using the same, in which the machining center has a plurality of vibration sensors being arranged at different locations thereon so as to be used for detecting all kinds of machining vibrations during a machining process, and then the detected vibration signals are send to a vibration signal processor for analysis so as to enable a control signal to be issued according to a linear proportion principle and sent to an spindle override interface and a feedrate override interface of the machining center when the result of the detection exceeds a specific threshold, for enabling the spindle speed and the feedrate of the workpiece to be adjusted in an automatic manner with respect to the current working status of the machining center, and thus to prevent any machining vibration effectively from happening during the machining process.

The present disclosure provides an on-line vibration detection/adjustment module and a tool machining using the same, capable of greatly reducing all kinds of machining vibrations during the performing of a cutting process, by which not only the quality and efficiency of the cutting process can be ensured, but also the lifespan of the cutting tools used in the process can be prolonged, and moreover, they can be adapted for not only the conventional analog servo controller, but also the modern digital servo controller. In addition, since the controlling enabled by the on-line vibration detection/adjustment module of the present disclosure will not have any involvement with the gain of the control circuit embedded in the machining center, but is achieved by the use of control signals issued from the on-line vibration detection/adjustment module that is connected externally to the machining center for enabling the control signals to be fed to the computer numerical control (CNC) unit through the spindle override interface and the feedrate override interface that are originally configured inside the machining center. Thereby, since the control is achieved through an external module without any alteration to any internal structure or system of the machining center, the system stability of the machining center will not be affected.

In an exemplary embodiment of the invention, the present disclosure provides a machining center with on-line vibration detection/adjustment ability, which comprises: a machine frame, configured with a CNC unit, a carrier module, a spindle module, a feeding module, a spindle override interface, and a feedrate override interface in a manner that the carrier module, the spindle module, the feeding module, the spindle override interface, and the feedrate override interface are all respectively connected to the CNC unit; at least one vibration sensor, disposed on the machine frame for detecting vibration statuses of the machine frame and thus generating at least one vibration signal accordingly; and a vibration signal processor, electrically connected respectively to the at least one vibration sensor, the spindle override interface and the feedrate override interface, for receiving the at least one vibration signal and a load signal issued from the machine frame during the performing of a machining process, so as to be used in a calculation and thus generate correspondingly a speed adjustment signal to the spindle override interface and a feedrate adjustment signal to the feedrate override interface.

In another exemplary embodiment of the invention, the present disclosure provides an on-line vibration detection/adjustment module, adapted for a machining center configured with a spindle override interface and a feedrate override interface, which comprises: at least one vibration sensor, for detecting vibration statuses of the machining center and thus generating at least one vibration signal accordingly; and a vibration signal processor, for receiving the at least one vibration signal and a load signal issued from the machining center during the performing of a machining process, so as to be used in a calculation and thus generate correspondingly a speed adjustment signal and a feedrate adjustment signal.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
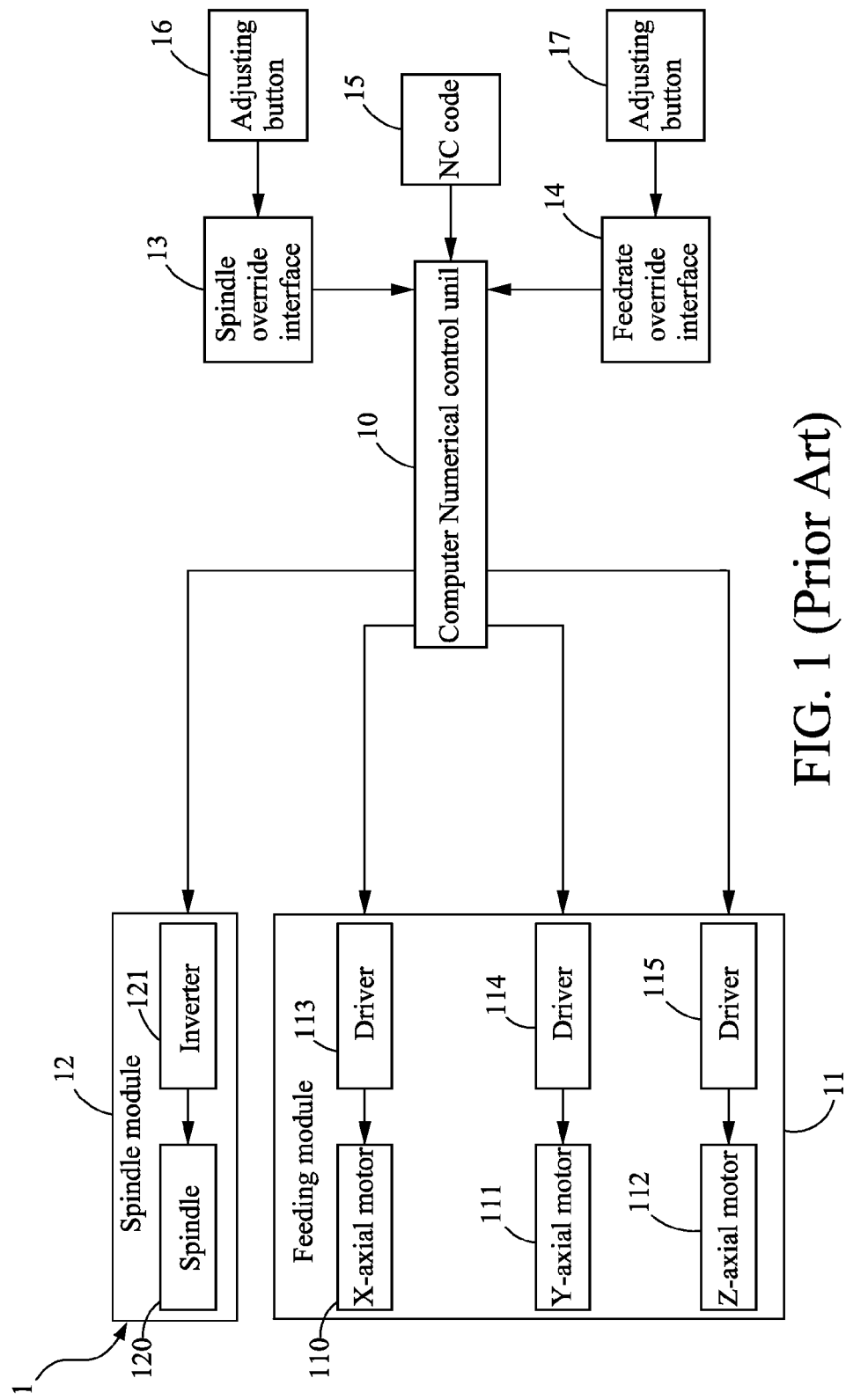
FIG. 1 is a schematic diagram showing a conventional machining center configuration.
Figure 2:
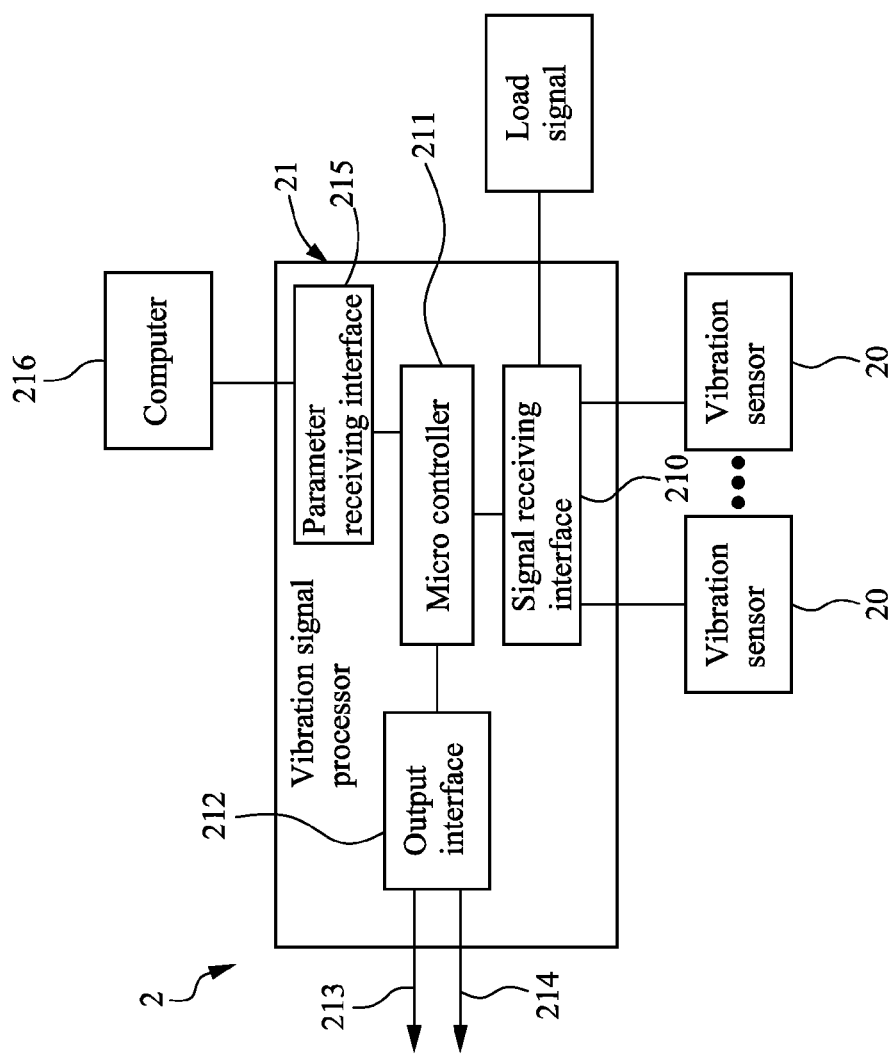
FIG. 2 is a block diagram illustrating an on-line vibration detection/adjustment module according to an embodiment of the present disclosure.

Please refer to FIG. 2, which is a block diagram illustrating an on-line vibration detection/adjustment module according to an embodiment of the present disclosure. The on-line vibration detection/adjustment module 2 is adapted for a machining center configured with a spindle override interface and a feedrate override interface, whereas the spindle override interface and the feedrate override interface are coupled respectively to two adjusting buttons that are provided for a user to adjust the spindle speed and the feedrate manually in response to the machining status of the machining center in a real-time manner. Generally, by rotating the two adjusting buttons, the CNC codes are changed correspondingly so as to enabling the spindle speed or feedrate to increase or decrease proportionally.

For example, when the current spindle speed and the feedrate specified according to CNC codes are A and B in respective, and it is determined by a user that the settings of the spindle speed and the feedrate are not able to cope with the machining vibrations caused either by the machining process itself or by the vibrations from ambient environment since adverse affects, such as imprecise processing or deteriorated surface qualities, had been detected, the user will manually change the setting of the spindle speed and the feedrate by rotating the two adjusting buttons, in this case, for reducing the two by 50% and thus defining the spindle speed and the feedrate to be 0.5A and 0.5B in respective. On the other hand, the spindle speed and the feedrate also can be increased by the rotating of the corresponding adjusting buttons. It is noted that during the rotating of the adjusting buttons, signals corresponding to the rotation will be transmitted to the CNC unit through the spindle override interface and the feedrate override interface, where they are used for triggering the CNC unit to generate corresponding control signals for controlling the spindle of the machining center as well as its axial motors to function accordingly.

As shown in FIG. 2, the on-line vibration detection/adjustment module 2 comprises: at least one vibration sensor 20, for detecting vibration statuses of an object so as to generate at least one vibration signal accordingly; and a vibration signal processor 21, for receiving the at least one vibration signal and a load signal issued from a machining center during the performing of a machining process, so as to be used in a calculation and thus generate correspondingly a speed adjustment signal 213 and a feedrate adjustment signal 214. In this embodiment, the vibration sensor 20 can be a micro-electromechanical (MEMS) sensor or an accelerometer, but is not limited thereby. In addition, the load signal is obtained through the detection of a load on the spindle of the machining center during the performing of the machining process, whereas the load detection can be performed by an inverter coupled to the spindle or by detecting the force working on the cutting tool that is coupled to the spindle, so that the load signal can be the signal outputted from the inverter or the signal relating to the force subjected by the cutting tool.

Moreover in this embodiment, the vibration signal processor 21 further comprises: a signal receiving interface 210, connected to the at least one vibration sensor 20 for receiving the at least one vibration signal and the load signal relating to the spindle of the machining center as well; a micro processor 211, electrically connected with the signal receiving interface 210, for performing a evaluation based upon the received vibration signal and the load signal so as to generate the speed adjustment signal 213 and the feedrate adjustment signal 214 accordingly; and an output interface 212, connected to the micro processor 211 for outputting the corresponding speed adjustment signal 213 and the feedrate adjustment signal 241. In addition, the micro processor 211 can be a single-chip processor, but is not limited thereby that is can be any processor with calculation ability; and the output interface 213 can be a solid state relay (SSR). Furthermore, in order to be able to change the programs, evaluation logics and the related parameters for defining required spindle speed and feedrate under different vibration statuses with respect to various processing tools, temperatures, and workpiece materials, the vibration signal processor 21 is further configured with a parameter receiving interface 215, provided for electrically connecting with an external computer while enabling the external computer to alter the parameters or evaluation logics of the micro processor 211 through the connection with the parameter receiving interface. In this embodiment, the parameter receiving interface 215 can be a RS-232 interface or other interface with data transmission ability. In addition, the external computer can be a desk-top computer or a notebook computer.

Figure 3:
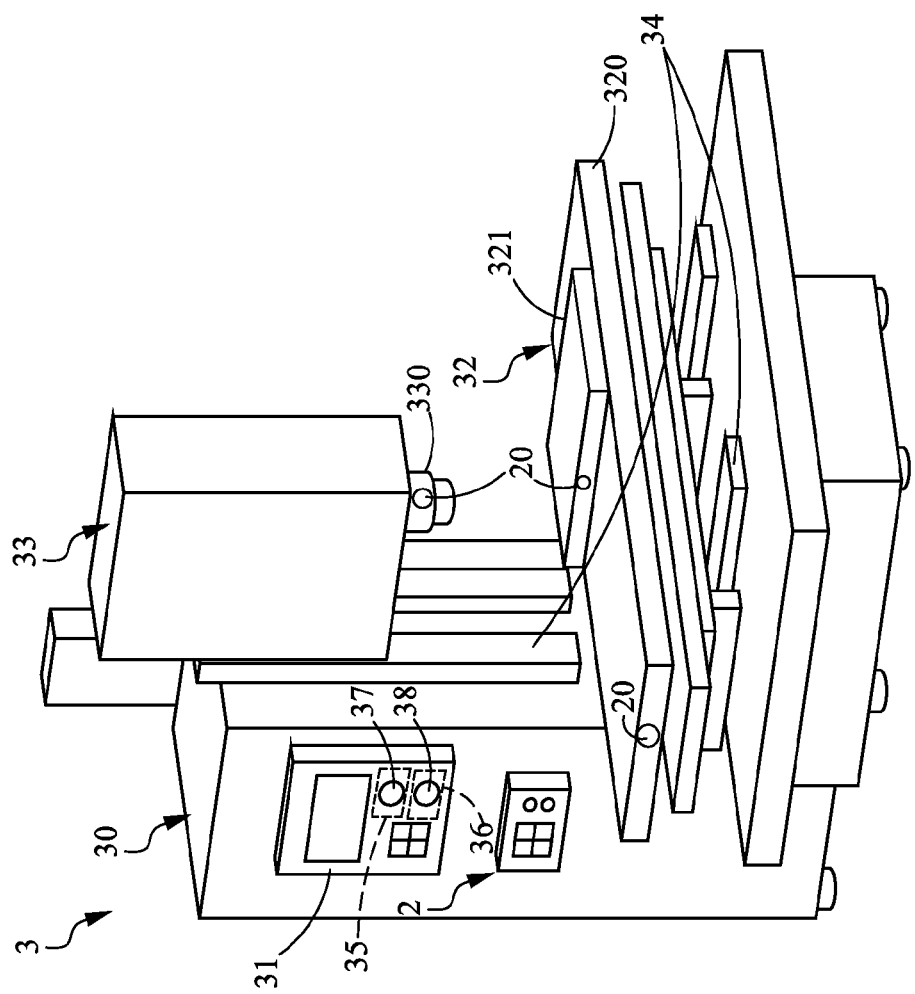
FIG. 3 is a three-dimensional view of a machining center with on-line vibration detection/adjustment ability according to the present disclosure.
Figure 4:
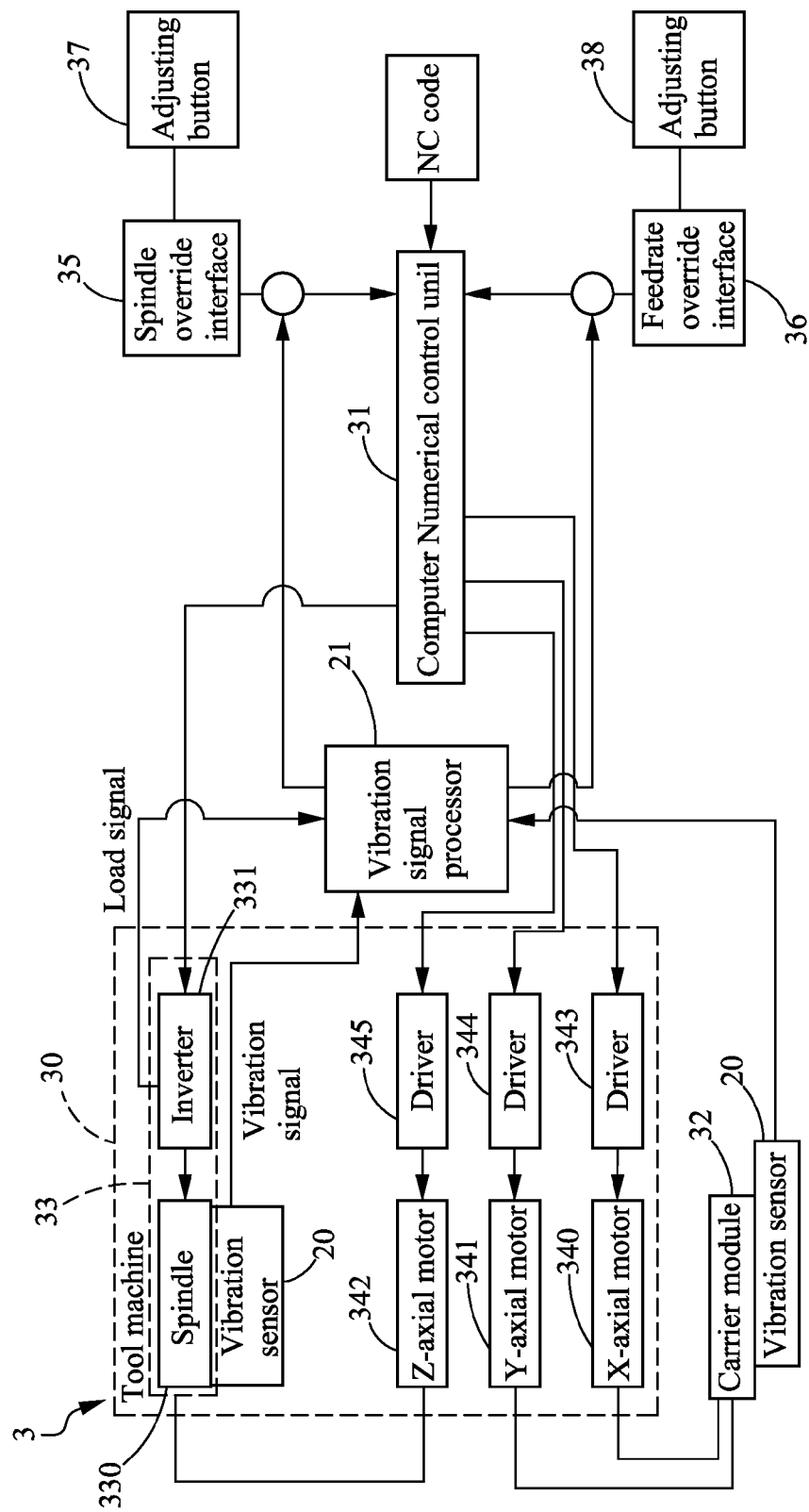
FIG. 4 is a block diagram illustrating a machining center with on-line vibration detection/adjustment ability according to an embodiment of the present disclosure.

Please refer to FIG. 3 and FIG. 4, which are respectively a three-dimensional view of a machining center with on-line vibration detection/adjustment ability and a block diagram illustrating a machining center with on-line vibration detection/adjustment ability according to an embodiment of the present disclosure. In this embodiment, the machining center 3 includes a machine frame 30 and an on-line vibration detection/adjustment module 2, in which the machine frame 30 is configured with a computer numerical control (CNC) unit 31, a carrier module 32, a spindle module 33, a feeding module 34, a spindle override interface 35, and a feedrate override interface 36 in a manner that the carrier module 32, the spindle module 33, the feeding module 34, the spindle override interface 35, and the feedrate override interface 36 are all respectively connected to the CNC unit 31. It is noted that the CNC unit 31 can be a CNC device manufactured by FANUC, Siemens, or an EPCIO motion control module, but is not limited thereby.

Wherein, the carrier module 32 is further comprised of: a platform 320, and a workpiece holding unit 321, in which the platform 320 is constructed coupled to the feeding module 34 so as to be driven thereby and thus perform a two-dimensional line movement; and the workpiece holding unit 321, being disposed on the platform 321, is provided for holding a workpiece. In addition, the feeding module 34 which is composed of motors and guide rails, is known to those skilled in the art and thus is not described further herein, but is only shown schematically in FIG. 3 and FIG. 4. In this embodiment, the feeding module 34 is capable of generating a three-dimensional linear movement, according to that it is composed of an X-axial motor 340, a Y-axial motor 341 and a Z-axial motor 342 along with their corresponding drivers 343, 344 and 345. Moreover, in this embodiment, the X-axial motor 341 and the Y-axial motor 342 are coupled to the platform 320 while the Z-axial motor 342 is coupled to the spindle module 33 for enabling the spindle module 33 to move linear along the Z-axis direction. In another embodiment, the feeding module is only coupled with the platform 320 so that the platform 320 can be driven thereby to perform a three-dimensional linear movement.

In addition, the spindle module 33 is further comprised of a spindle 330 and an inverter 331, in which the spindle 330 is coupled to the inverter 331 while the inverter 331 is coupled to the CNC unit 31 and the vibration signal processor 21. Thereby, the inverter 331 not only is capable of receiving a control signal from the CNC unit 31, but also is able to transmit a load signal to the vibration signal processor 21. Moreover, as the spindle override interface 35 and the feedrate override interface 36, being connected to the CNC unit 31, are respectively connected to two adjusting buttons 37 and 38, the ratio of the spindle speed and the feedrate can be changed simply by the rotations of the two adjusting buttons 37, 38. That is, by rotating the two adjusting buttons 37, 38, the NC codes are changed correspondingly so as to enabling the spindle speed or feedrate to increase or decrease proportionally.

The on-line vibration detection/adjustment module 2 includes at least one vibration sensor 20 and a vibration signal processor 21. It is noted that the vibration sensor 20 and the vibration signal processor 21 are structured the same as those shown in FIG. 2, and thus are not described further herein. In this embodiment, there are a plurality of such vibration sensors 20 being disposed on the machine frame 30 for detecting vibration statuses of the machine frame 30 and thus generating at least one vibration signal accordingly. Generally, the vibration sensors are disposed on the carrier module 32 as well as the spindle module of the machine frame 30, so that the vibration statuses of the machining center 3 can be detected during the performing of the machining process. It is noted that for those vibration sensors 20 that are disposed on the carrier module 32, they can be place on the platform 320 or on the workpiece holding unit 321; and for those vibration sensors 20 that are disposed on the spindle module 33, they can be arranged on the spindle 330. Nevertheless, the locations of the vibration sensors can be determined at will and according to actual requirement, that they are not limited by the aforesaid embodiments.

The vibration signal processor 21 is electrically connected respectively to the at least one vibration sensor 20, the spindle override interface 35 and the feedrate override interface 36 for receiving the at least one vibration signal and a load signal issued from the machining center during the performing of a machining process, so as to be used in a calculation and thus generate correspondingly a speed adjustment signal to the spindle override interface 35 and a feedrate adjustment signal to the feedrate override interface 36. In this embodiment, the load signal is issued by the inverter of the spindle module, but is not limited thereby. For instance, the load signal can be generated according to the detecting of the force working on the cutting tool that is coupled to the spindle, so that the load signal can be the relating to the force subjected by the cutting tool.

As shown in FIG. 2 and FIG. 4, the signal receiving interface 210 of the vibration signal processor 21 is connected to the at least one vibration sensor 20 and the inverter 331, while the output interface 212 is electrically connected to the spindle override interface 35 and the feedrate override interface 36. Thereby, the vibration signals from the vibration sensors 20 are received by the vibration signal processor 21 where they are grouped with the load signal relating to the loading upon the spindle that is issued by the inverter 33, and then are used in an calculation for determine whether the load or the vibration had exceeded a specific threshold; and, if so, a speed adjustment signal and a feedrate adjustment signal are generated according to a linear proportion principle and sent to the CNC unit 31 respectively through the spindle override interface 35 and the feedrate override interface 36 of the machining center for enabling the same to generate and issue corresponding speed adjusting command and feedrate adjusting command to the spindle module 33 and the feeding module 34 to be used for controlling the spindle speed and the feedrate of the workpiece to be adjusted in an automatic manner, and thus preventing any machining vibration effectively from happening during the machining process.

Figure 5:
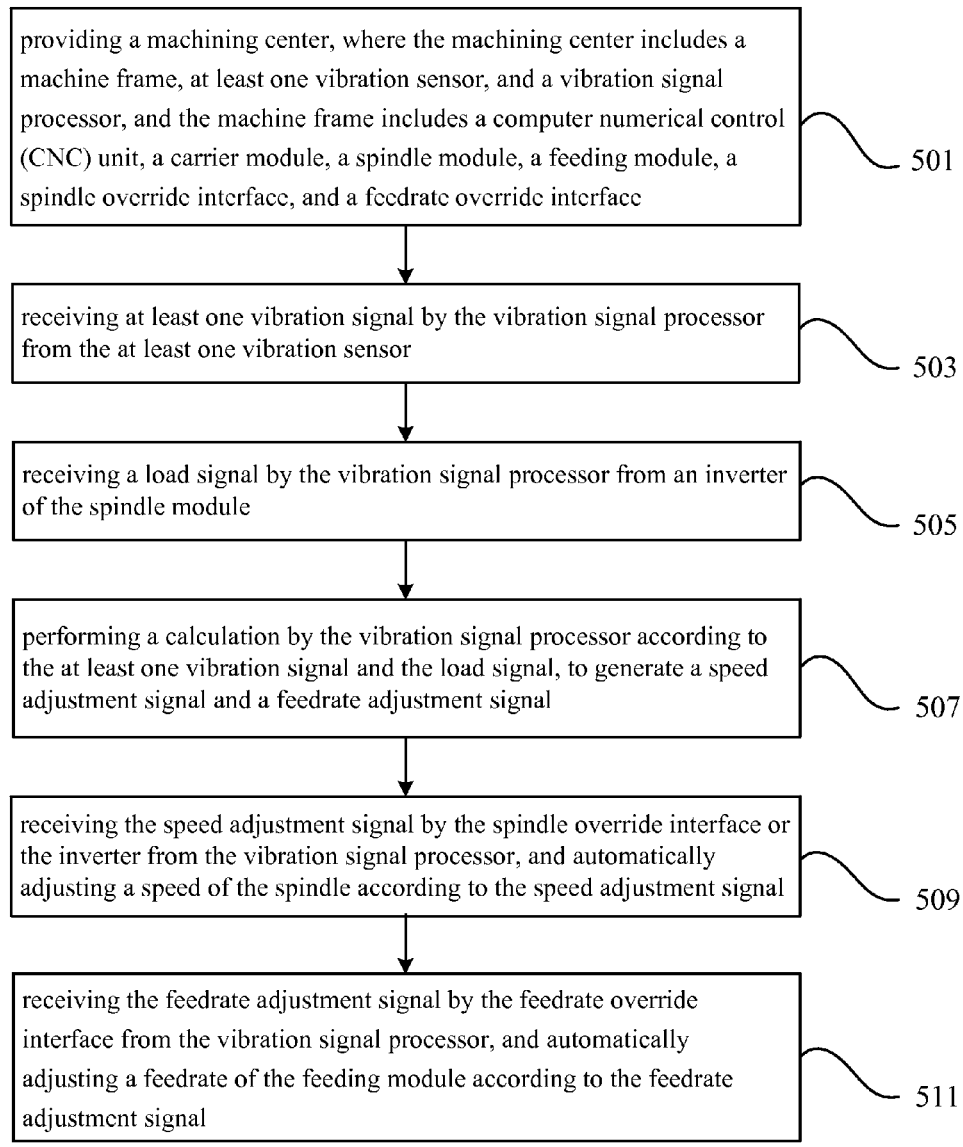
FIG. 5 is a schematic flowchart illustrating a method of on-line vibration detection/adjustment according to an embodiment of the present disclosure.

In one aspect, the present disclosure provides a method of on-line vibration detection/adjustment using the structure and the process described above. In one embodiment, as shown in FIG. 5, the method includes steps 501 to 511. In step 501, a machine center is provided. The machine center includes a machine frame, at least one vibration sensor and a vibration signal processor. The machine frame includes a computer numerical control (CNC) unit, a carrier module, a spindle module, a feeding module, a spindle override interface, and a feedrate override interface. The carrier module, the spindle module, the feeding module, the spindle override interface, and the feedrate override interface are all respectively connected to the CNC unit. The at least one vibration sensor is disposed on the carrier module for generating at least one vibration signal. The vibration signal processor is electrically connected respectively to the at least one vibration sensor, the spindle override interface, the feedrate override interface and an inverter of the spindle module.

In step 503, the vibration signal processor receives the at least one vibration signal from the at least one vibration sensor.

In step 505, the vibration signal processor receives a load signal from the-inverter.

In step 507, the vibration signal processor performs a calculation according to the at least one vibration signal and the load signal, and generates a speed adjustment signal and a feedrate adjustment signal.

In step 509, the spindle override interface or the inverter receives the speed adjustment signal from the vibration signal processor, and automatically adjusts a speed of the spindle according to the speed adjustment signal.

In step 511, the feedrate override interface receives the feedrate adjustment signal from the vibration signal processor, and automatically adjusts a feedrate of the feeding module according to the feedrate adjustment signal.

In one embodiment, the at least one vibration sensor is a micro-electro-mechanical (MEMS) sensor or an accelerometer.

In one embodiment, the machining center further includes a second vibration sensor arranged on the spindle module for detection a vibration status of a spindle configured in the spindle module.

In one embodiment, the carrier module further includes a platform coupled to the feeding module, a workpiece holding unit disposed on the platform. In one embodiment, the at least one vibration sensor is disposed on the platform or the workpiece holding unit.

In one embodiment, the vibration signal processor further includes a signal receiving interface, a micro processor, and an output interface. The signal receiving interface is connected to the at least one vibration sensor and the inverter of the spindle module for receiving the at least one vibration signal and the load signal respectively. The micro processor is electrically connected with the signal receiving interface, for performing a evaluation based upon the received vibration signal and the load signal so as to generate the speed adjustment signal and the feedrate adjustment signal accordingly. The output interface is connected respectively to the spindle override interface and the inverter and the feedrate override interface for transmitting the corresponding speed adjustment signal and the feedrate adjustment signal thereto.

In one embodiment, the vibration signal processor further includes a parameter receiving interface, for electrically connecting with an external computer for enabling the external computer to alter the parameters of the micro processor through the connection with the parameter receiving interface.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A machining center with on-line vibration detection/adjustment ability, comprising:
   a machine frame, comprising a computer numerical control (CNC) unit, a carrier module, a spindle module, a feeding module, a spindle override interface, and a feedrate override interface, wherein the carrier module, the spindle module, the feeding module, the spindle override interface, and the feedrate override interface are all respectively connected to the CNC unit;
   at least one vibration sensor, disposed on the carrier module and thus generating at least one vibration signal accordingly; and
   a vibration signal processor, electrically connected respectively to the at least one vibration sensor, the spindle override interface, the feedrate override interface and an inverter of the spindle module, wherein during a machining process, the vibration signal processor receives the at least one vibration signal from the at least one vibration sensor and a load signal from the inverter, and performs a calculation to generate a speed adjustment signal and a feedrate adjustment signal, the spindle override interface or the inverter receives the speed adjustment signal and automatically adjusts a speed of the spindle, and the feedrate override interface receives the feedrate adjustment signal and automatically adjusts a feedrate of the feeding module.

2. The machining center of claim 1, wherein the at least one vibration sensor is a micro-electro-mechanical (MEMS) sensor.

3. The machining center of claim 1, wherein the at least one vibration sensor is an accelerometer.

4. The machining center of claim 1, further comprising a second vibration sensor arranged on the spindle module for detection a vibration status of a spindle configured in the spindle module.

5. The machining center of claim 1, wherein the carrier module further comprises:
   a platform, coupled to the feeding module; and
   a workpiece holding unit, disposed on the platform.

6. The machining center of claim 5, wherein the at least one vibration sensor is disposed on a device selected from the group consisting of: the platform and the workpiece holding unit.

7. The machining center of claim 1, wherein the vibration signal processor further comprises:
- a signal receiving interface, connected to the at least one vibration sensor and the inverter of the spindle module for receiving the at least one vibration signal and the load signal;
- a micro processor, electrically connected with the signal receiving interface, for performing a evaluation based upon the received vibration signal and the load signal so as to generate the speed adjustment signal and the feedrate adjustment signal accordingly; and
- an output interface, connected respectively to the spindle override interface and the inverter and the feedrate override interface for transmitting the corresponding speed adjustment signal and the feedrate adjustment signal thereto.

8. The machining center of claim 7, wherein the vibration signal processor further comprises:
- a parameter receiving interface, for electrically connecting with an external computer for enabling the external computer to alter the parameters of the micro processor through the connection with the parameter receiving interface.

9. An on-line vibration detection/adjustment module, adapted for a machining center configured with a spindle override interface, an inverter and a feedrate override interface, comprising:
- at least one vibration sensor disposed on a carrier module of the machining center, for detecting vibration statuses so as to generate at least one vibration signal accordingly; and
- a vibration signal processor electrically connected respectively to the at least one vibration sensor, the inverter, the spindle override interface and the feedrate override interface, wherein during a machining process, the vibration signal processor receives the at least one vibration signal from the at least one vibration sensor and a load signal from the inverter, and performs a calculation to generate a speed adjustment signal and a feedrate adjustment signal, the spindle override interface or the inverter receives the speed adjustment signal and automatically adjusts a speed of the spindle, and the feedrate override interface receives the feedrate adjustment signal and automatically adjusts a feedrate of the feeding module.

10. The module of claim 9, wherein the at least one vibration sensor is a micro-electro-mechanical (MEMS) sensor.

11. The module of claim 9, wherein the at least one vibration sensor is an accelerometer.

12. The module of claim 9, wherein the vibration signal processor further comprises:
- a micro processor; and
- a parameter receiving interface electrically connected with the micro processor, for electrically connecting with an external computer while enabling the external computer to alter the parameters of the micro processor through the connection with the parameter receiving interface.

13. The module of claim 9, wherein the vibration signal processor further comprises:
- a signal receiving interface, connected to the at least one vibration sensor and the inverter of the spindle module for receiving the at least one vibration signal and the load signal;
- a micro processor, electrically connected with the signal receiving interface, for performing an evaluation based upon the received vibration signal and the load signal so as to generate the speed adjustment signal and the feedrate adjustment signal accordingly; and
- an output interface, connected to the micro processor for outputting the corresponding speed adjustment signal and the feedrate adjustment signal.

14. A method of on-line vibration detection/adjustment, providing a machining center, wherein the machining center comprises:
- a machine frame having a computer numerical control (CNC) unit, a carrier module, a spindle module, a feeding module, a spindle override interface, and a feedrate override interface, wherein the carrier module, the spindle module, the feeding module, the spindle override interface, and the feedrate override interface are all respectively connected to the CNC unit;
- at least one vibration sensor, disposed on the carrier module for generating
at least one vibration signal; and
- a vibration signal processor, electrically connected respectively to the at least one vibration sensor, the spindle override interface, the feedrate override interface and an inverter of the spindle module;

receiving the at least one vibration signal by the vibration signal processor from the at least one vibration sensor;
receiving a load signal by the vibration signal processor from the inverter;
performing a calculation by the vibration signal processor according to the at least one vibration signal and the load signal, to generate a speed adjustment signal and a feedrate adjustment signal;
receiving the speed adjustment signal by the spindle override interface or the inverter from the vibration signal processor, and automatically adjusting a speed of the spindle according to the speed adjustment signal; and
receiving the feedrate adjustment signal by the feedrate override interface from the vibration signal processor, and automatically adjusting a feedrate of the feeding module according to the feedrate adjustment signal.

15. The method of claim 14, wherein the at least one vibration sensor is selected from the group consisting of a micro-electro-mechanical (MEMS) sensor or an accelerometer.

16. The method of claim 14, wherein the machining center further comprises a second vibration sensor arranged on the spindle module for detection a vibration status of a spindle configured in the spindle module.

17. The method of claim 14, wherein the carrier module further comprises:
- a platform, coupled to the feeding module; and
- a workpiece holding unit, disposed on the platform.

18. The method of claim 17, wherein the at least one vibration sensor is disposed on a device selected from the group consisting of: the platform and the workpiece holding unit.

19. The method of claim 14, wherein the vibration signal processor further comprises:
- a signal receiving interface, connected to the at least one vibration sensor and the inverter of the spindle module for receiving the at least one vibration signal and the load signal;
- a micro processor, electrically connected with the signal receiving interface, for performing a evaluation based upon the received vibration signal and the load signal so as to generate the speed adjustment signal and the feedrate adjustment signal accordingly; and an output interface, connected respectively to the spindle override interface and the inverter and the feedrate override interface for transmitting the corresponding speed adjustment signal and the feedrate adjustment signal thereto.

20. The method of claim 19, wherein the vibration signal processor further comprises:

a parameter receiving interface, for electrically connecting with an external computer for enabling the external computer to alter the parameters of the micro processor through the connection with the parameter receiving interface.

* * * * *